US011953416B2

(12) United States Patent
Zhang et al.

(10) Patent No.: US 11,953,416 B2
(45) Date of Patent: Apr. 9, 2024

(54) DEVICE FOR DETERMINING THRESHOLD WIND SPEED IN INTERMITTENT WIND-SAND FLOW

(71) Applicant: Lanzhou University, Gansu (CN)

(72) Inventors: Jie Zhang, Lanzhou (CN); Jianyong Xie, Lanzhou (CN); Ao Li, Lanzhou (CN); Yanhong Song, Lanzhou (CN); Lihang Xu, Lanzhou (CN); Ning Huang, Lanzhou (CN)

(73) Assignee: Lanzhou University, Lanzhou (CN)

( * ) Notice: Subject to any disclaimer, the term of this patent is extended or adjusted under 35 U.S.C. 154(b) by 107 days.

(21) Appl. No.: 17/725,510

(22) Filed: Apr. 20, 2022

(65) Prior Publication Data
US 2023/0168170 A1 Jun. 1, 2023

(30) Foreign Application Priority Data

Nov. 30, 2021 (CN) .......................... 202122976043.1

(51) Int. Cl.
| | |
|---|---|
| *G01N 15/06* | (2006.01) |
| *G01P 5/06* | (2006.01) |
| *G01P 5/12* | (2006.01) |
| *G01N 15/00* | (2006.01) |
| *G01N 15/075* | (2024.01) |

(52) U.S. Cl.
CPC ............... *G01N 15/06* (2013.01); *G01P 5/06* (2013.01); *G01P 5/12* (2013.01); *G01N 2015/0046* (2013.01); *G01N 15/075* (2024.01)

(58) Field of Classification Search
CPC .............. G01P 5/12; G01N 2015/0046; G01N 2015/0693
See application file for complete search history.

(56) References Cited

FOREIGN PATENT DOCUMENTS

| CN | 109781373 | A | * | 5/2019 | |
|---|---|---|---|---|---|
| CN | 110286072 | A | * | 9/2019 | ............. G01N 15/06 |
| CN | 111830238 | A | * | 10/2020 | |
| CN | 213812804 | U | * | 7/2021 | ............. G01M 9/00 |

OTHER PUBLICATIONS

Machine translation of CN-111830238-A (Year: 2020).*
Machine translation of CN-109781373-A (Year: 2019).*
Machine translation of CN-213812804-U (Year: 2021).*
Machine translation of CN-110286072-A (Year: 2019).*

* cited by examiner

*Primary Examiner* — Nathaniel J Kolb
(74) *Attorney, Agent, or Firm* — Bochner PLLC; Andrew D. Bochner

(57) ABSTRACT

The present disclosure relates to the field of environment monitoring equipment, and in particular, to a device for determining threshold wind speed in intermittent wind-sand flow. The device includes a base. A rotary bearing is installed on the base. A circuitry is installed in the base. A telescopic rod is installed through the rotary bearing. A wind driven vane and an earth surface wind-sand monitoring frame are installed on the telescopic rod. Photoelectric induction probes are installed on the earth surface wind-sand monitoring frame.

7 Claims, 4 Drawing Sheets

DEVICE FOR DETERMINING THRESHOLD WIND SPEED IN INTERMITTENT WIND-SAND FLOW

CROSS REFERENCE TO RELATED APPLICATION(S)

This patent application claims the benefit and priority of Chinese Patent Application No. 202122976043.1, filed on Nov. 30, 2021, the disclosure of which is incorporated by reference herein in its entirety as part of the present application.

TECHNICAL FIELD

The present disclosure relates to the field of environment monitoring equipment, in particular to a device for determining threshold wind speed in intermittent wind-sand flow.

BACKGROUND ART

Sandy desertification is one of the main types of land degradation. The area of deserts and desertification land in China is up to 1.49 million square kilometers, accounting for about 15.5% of national territorial area, so it is the country with the most serious desertification in the world. A wind-sand hazard is a major form of environmental disasters in a sand region. Sand particles in wind-sand flow have a great destructive effect on traffic facilities and communication transmission. Therefore, performing systematic monitoring and scientific researches on wind-sand activities is an important basis for prevention and control of desertification, while how to improve the monitoring efficiency and the observation accuracy are main problems at present.

The movement of a wind field and the wind-sand flow under real conditions in the field has obvious instable (intermittent) characteristics, and the response of the wind-sand flow to the wind field cannot be completely synchronized in time, which brings great difficulties to determine the threshold wind speed (the minimum wind speed that causes sand movement) of the wind-sand flow in the field. At present, the commonly adopted threshold wind speed measurement mainly uses artificial subjective determination of sand movement and takes the average wind speed in a certain time period under corresponding conditions as the critical wind speed. Considering the instability of the wind-sand flow, the hysteresis of wind speed response, and the like, the above-mentioned traditional critical wind speed determination mode will cause a great measurement error. At present, there is not equipment which is relatively objective and can directly determine the threshold wind speed of the wind-sand flow.

SUMMARY

The present disclosure provides a device for determining threshold wind speed in intermittent wind-sand flow in the field, which effectively solves the problems in the prior art. According to the device, an earth surface wind-sand monitoring device which can move along with a wind direction is provided with photoelectric induction probes to continuously observe sand flux near an earth surface, wind speed at different heights are observed in real time by using one-dimensional hot-wire anemometers, and an accurate threshold wind speed value is obtained by analyzing a probability distribution curve of the sand flux and the wind speed in a measurement time period in real time.

In order to achieve the above objective, a technical solution adopted by the present disclosure is as follows specifically.

A device for determining the threshold wind speed in the intermittent wind-sand flow includes a base 1. A rotary bearing 2 is installed on the base 1. A circuitry 3 is installed in the base 1. A rotatable telescopic rod 5 is installed through the rotary bearing 2. A wind driven vane 6 and an earth surface wind-sand monitoring frame 7 are installed through the telescopic rod 5. Photoelectric induction probes 8 are installed on the earth surface wind-sand monitoring frame 7.

A circuitry 3 and an external plug 4 are installed on the base 1.

The circuitry 3 is provided with a memory and a power pack.

The wind driven vane 6 and the earth surface wind-sand monitoring frame 7 are installed on two sides of the telescopic rod 5 in a straight line.

A gap is formed in one end of the earth surface wind-sand monitoring frame 7. The two ends of the gap are used for installing the photoelectric induction probes 8. The photoelectric induction probes 8 are connected to the circuitry 3 through lines.

One-dimensional hot-wire anemometers 9 are installed on the earth surface wind-sand monitoring frame 7. The one-dimensional hot-wire anemometers 9 are connected to the circuitry 3 through lines.

An installation rod 10 is installed at an end of the telescopic rod 5. A plurality of one-dimensional hot-wire anemometers 9 are installed on the installation rod 10. The one-dimensional hot-wire anemometers 9 are connected to the circuitry 3 through lines.

The present disclosure has the beneficial effects that: 1) the device monitors on the earth surface by using flow data, cannot produce quicksand accumulation, is suitable for long-term fixed-point monitoring of wind-sand flow in the field, and can effectively ensure the monitoring time length and reduce the labor cost. The observation data has an important reference value for a sand control design of engineering in a desert region.

2) The device takes wind power as driving power, the earth surface wind and sand monitoring frame can face the wind direction in real time, and the wind-sand data and the wind power data of the earth surface can be effectively monitored.

In conclusion, by installing the photoelectric induction probes in the earth surface wind and sand motoring frame which can move along the wind direction, the device can accurately monitor the wind-blown-sand data on the earth surface in real time, which can effectively improve the earth surface wind and sand monitoring efficiency and the observation accuracy.

Figure 1:
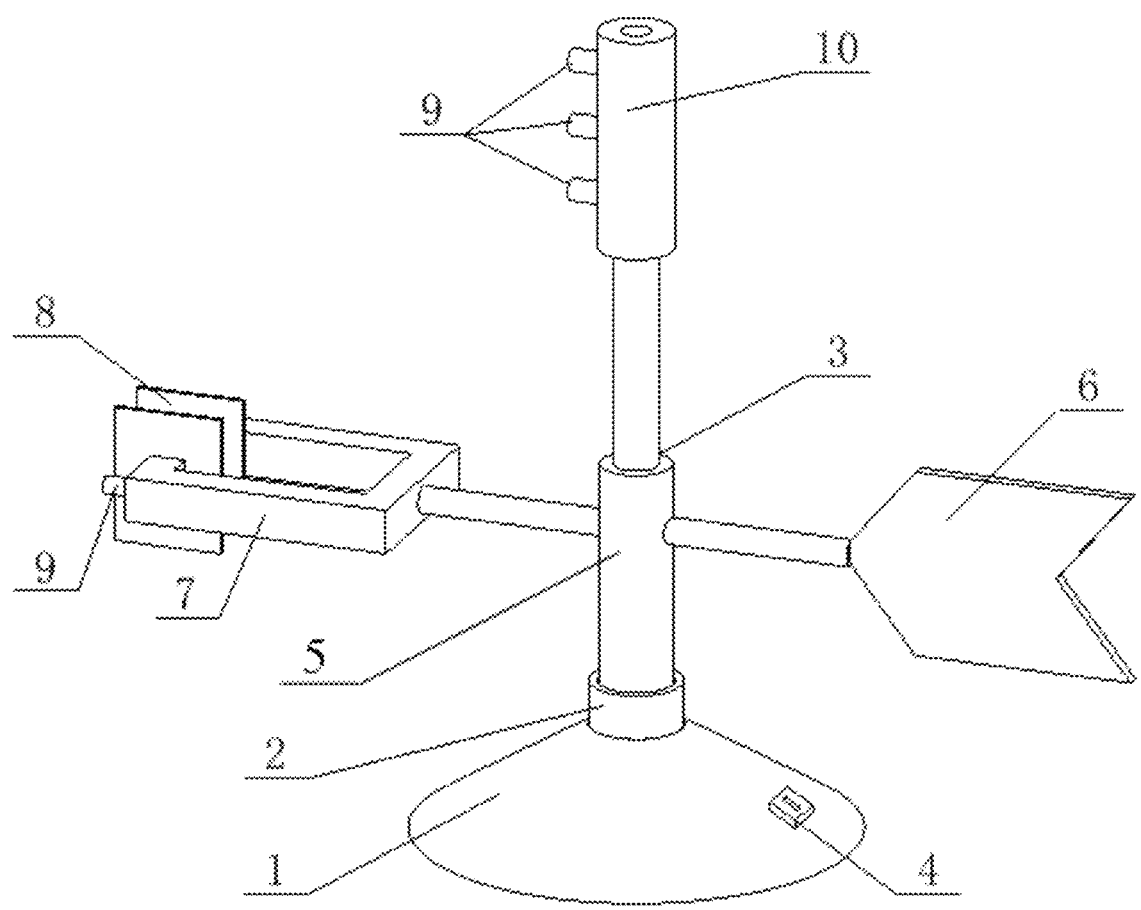
FIG. 1 is a structural schematic diagram of the present disclosure.

Reference signs in the drawings: base 1, rotary bearing 2, circuitry 3, external plug 4, telescopic rod 5, wind driven vane 6, earth surface wind-sand monitoring frame 7, photoelectric induction probe 8, one-dimensional hot-wire anemometer 9, and installation rod 10.

DETAILED DESCRIPTION OF THE EMBODIMENTS

The technical solution of the present disclosure will be further described below with reference to accompanying drawings and through specific embodiments.

Embodiment 1

As shown in FIG. 1 to FIG. 4, a device for determining threshold wind speed of intermittent wind-sand flow aims to provide a device that can accurately measure wind-sand data and wind power data on an earth surface. The device includes an installation unit, an earth surface wind-sand monitoring unit, and a wind power monitoring unit. A specific installation structure is as follows.

Figure 2:
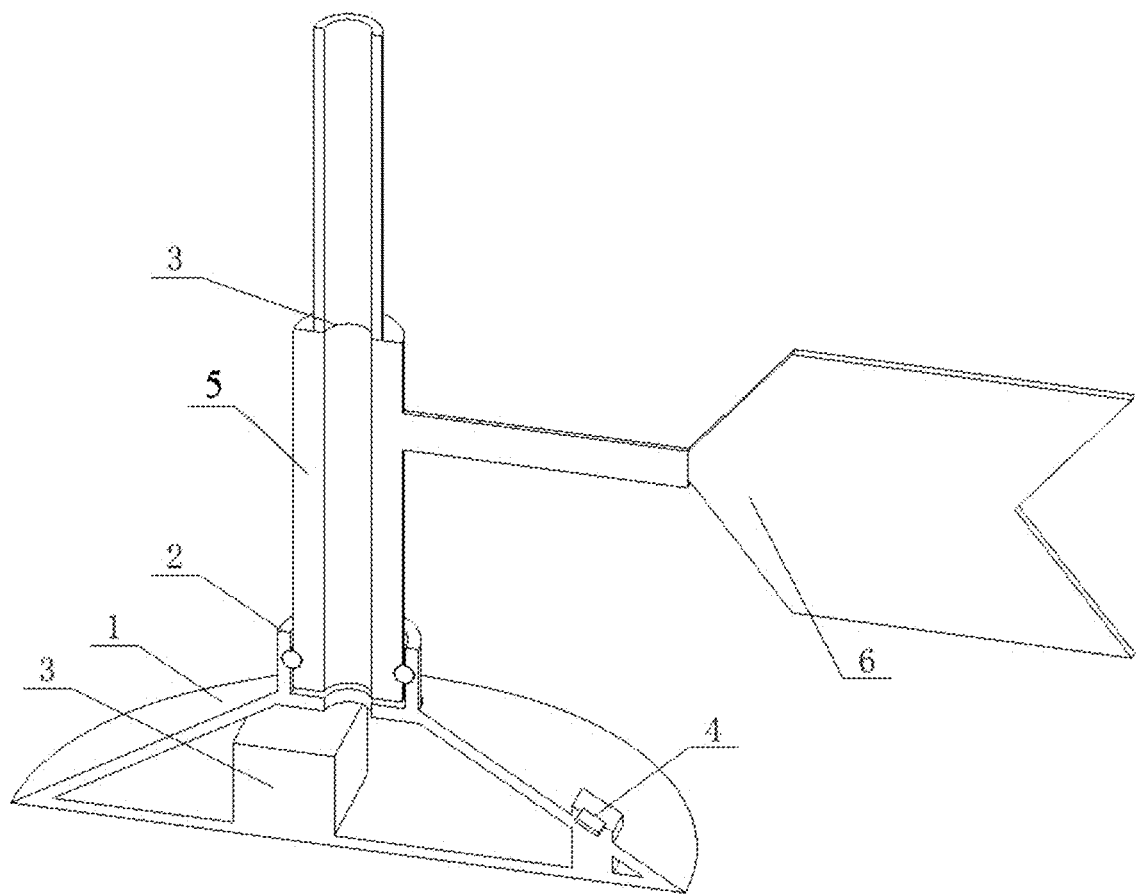
FIG. 2 is a sectional view of an installation unit.

As shown in FIG. 2, the installation unit includes a base 1, a rotary bearing 2, and a telescopic rod 5. The base 1 is a conical shell. During use, the base 1 is pre-buried underground to fix the overall device. The rotary bearing 2 is installed on the base 1. A rotatable telescopic rod 5 is installed through the rotary bearing 2.

A wind driven vane 6 and an earth surface wind-sand monitoring frame 7 are installed through the telescopic rod 5. In order to ensure accurate monitoring of earth surface wind and sand, the wind driven vane 6 and an earth surface wind-sand monitoring frame 7 are installed on two sides of the telescopic rod 5 in a straight line.

Figure 3:
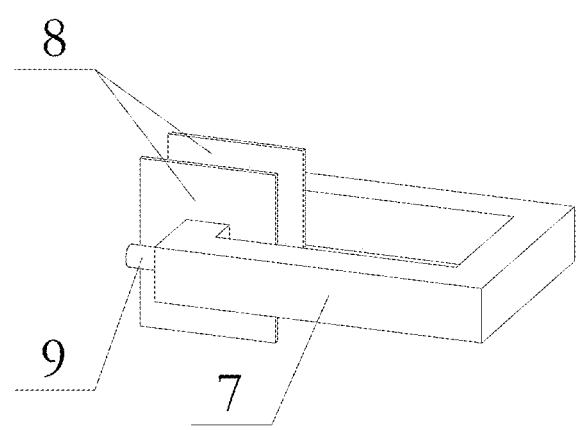
FIG. 3 is a schematic diagram of an earth surface wind-sand monitoring structure.
Figure 4:
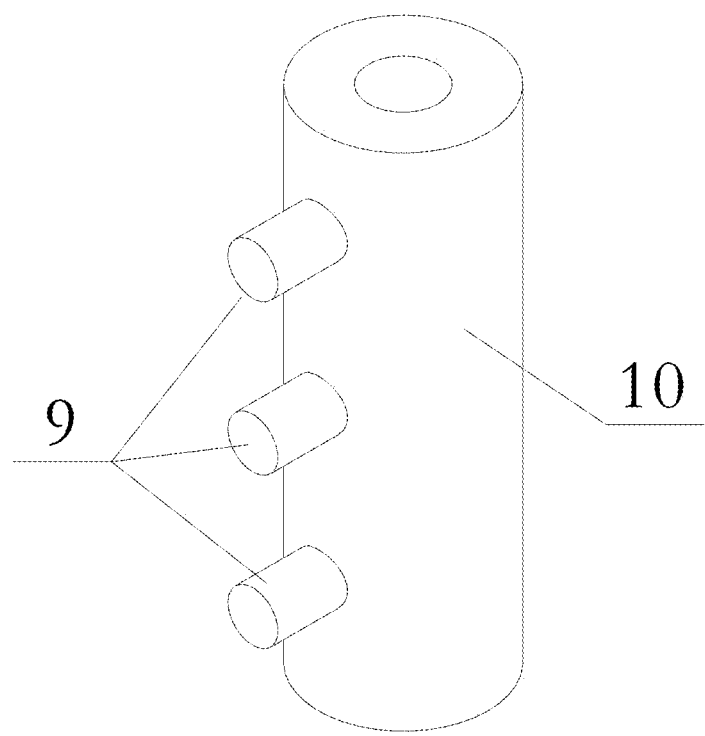
FIG. 4 is a schematic diagram of an installation rod and a one-dimensional hot-wire anemometer installation structure.

The earth surface wind-sand monitoring frame 7 is as shown in FIG. 3, and is a rectangular frame. The interior of the frame hollow, and is used for lines to interpenetrate. A gap is formed in one end of the rectangular frame, and is used for installing photoelectric induction probes 8. Earth surface wind-sand blocks a light beam when passing between the photoelectric induction probes 8, so as to produce current with different magnitudes, thereby performing earth surface wind-sand amount monitoring.

One-dimensional hot-wire anemometers 9 are installed on the earth surface wind-sand monitoring frame 7, and are used for monitoring earth surface wind speed.

An installation rod 10 is installed on the telescopic rod 5. Three groups of one-dimensional hot-wire anemometers 9 are installed, so that the wind power may be monitored accurately.

A circuitry 3 and an external plug 4 are installed in the base 1. The circuitry 3 is provided with a memory and a power pack. The photoelectric induction probes 8 and the plurality of one-dimensional hot-wire anemometers 9 are all connected to the circuitry 3 through lines, so as to realize transmission and storage of data.

A specific process is as follows: the photoelectric induction probes 8 are arranged at a height of 10 cm near the earth surface, and is used for acquiring the sand flux passing through a probe measurement region. By analyzing a time series of the sand flux near the earth surface, counting the cumulative time t of Q=0 in an observation time period $t_1$ to $t_0$ and the proportion a % of the cumulative time in the total measurement time, and meanwhile, aiming at different heights, the present embodiment can obtain wind speed probability density distribution for the wind speed time series at three heights of z=10 cm, 30 cm, and 50 cm above the ground. When an integral value of the wind speed probability density from 0 to a certain value is a %, the corresponding wind speed value at this time is the threshold wind speed at the corresponding height. By analyzing the average wind speed information at a plurality of heights (assuming that the average wind speed satisfies the logarithmic law $u_r=[(u^*/0.4)\ln(z/z_0)]$), the roughness length $z_0$ of the measured earth surface and a friction wind speed $u^*_t$ corresponding to the threshold wind speed $e_t$ may further be obtained. The photoelectric induction probes may also obtain particle size distribution information of the particles when obtaining the sand flux, so as to provide the particle size information corresponding to the wind-sand flow. So far, the device has realized systematic determination of the threshold wind speed in the field and corresponding environmental conditions, such as the friction wind speed, the earth surface roughness length, the particle size, etc.

For those skilled in the art, it is apparent that the present disclosure is not limited to the details of the above exemplary embodiments, and can be implemented in other specific forms without departing from the spirit or basic features of the present disclosure. Therefore, from any point of view, the embodiments should be regarded as exemplary but not restrictive. The scope of the present disclosure is limited by the attached claims rather than the above description. Therefore, it is intended to include all changes within the meaning and scope of the equivalent elements of the claims in the present disclosure. Any reference numeral in the claims shall not be regarded as limiting the claims involved.

In addition, it should be understood that although the description is described according to the embodiments, not every embodiment only contains an independent technical solution. This description of the description is only for the sake of clarity. Those skilled in the art should take the description as a whole, and the technical solutions in the various embodiments can also be properly combined to form other implementation manners that can be understood by those skilled in the art.

What is claimed is:

1. A device for determining threshold wind speed in intermittent wind-sand flow, comprising a base, wherein a rotary bearing is installed on the base; a circuitry is installed in the base; a rotatable telescopic rod is installed through the rotary bearing; a wind driven vane and an earth surface wind-sand monitoring frame are installed through the telescopic rod; and photoelectric induction probes are installed on the earth surface wind-sand monitoring frame.

2. The device for determining the threshold wind speed in intermittent wind-sand flow according to claim 1, wherein an external plug connected to the circuitry is installed on the base.

3. The device for determining the threshold wind speed in intermittent wind-sand flow according to claim 2, wherein the circuitry is provided with a memory and a power pack.

4. The device for determining the threshold wind speed in intermittent wind-sand flow according to claim 1, wherein the wind driven vane and the earth surface wind-sand monitoring frame are installed on two sides of the telescopic rod in a straight line.

5. The device for determining the threshold wind speed in intermittent wind-sand flow according to claim 1, wherein a gap is formed in one end of the earth surface wind-sand monitoring frame; the two ends of the gap are used for installing the photoelectric induction probes; and the photoelectric induction probes are connected to the circuitry through lines.

6. The device for determining the threshold wind speed in intermittent wind-sand flow according to claim 5, wherein one-dimensional hot-wire anemometers are installed on the earth surface wind-sand monitoring frame; and the one-dimensional hot-wire anemometers are connected to the circuitry through lines.

7. The device for determining the threshold wind speed in intermittent wind-sand flow according to claim 1, wherein an installation rod 10 is installed at an end of the telescopic rod; the plurality of one-dimensional hot-wire anemometers are installed on the installation rod; and the one-dimensional hot-wire anemometers are connected to the circuitry through lines.

* * * * *